R. R. PARISH.
METHOD OF MAINTAINING THE EFFICIENCY OF BRASS PICKLING SOLUTIONS.
APPLICATION FILED JAN. 11, 1913.
1,086,079.
Patented Feb. 3, 1914.
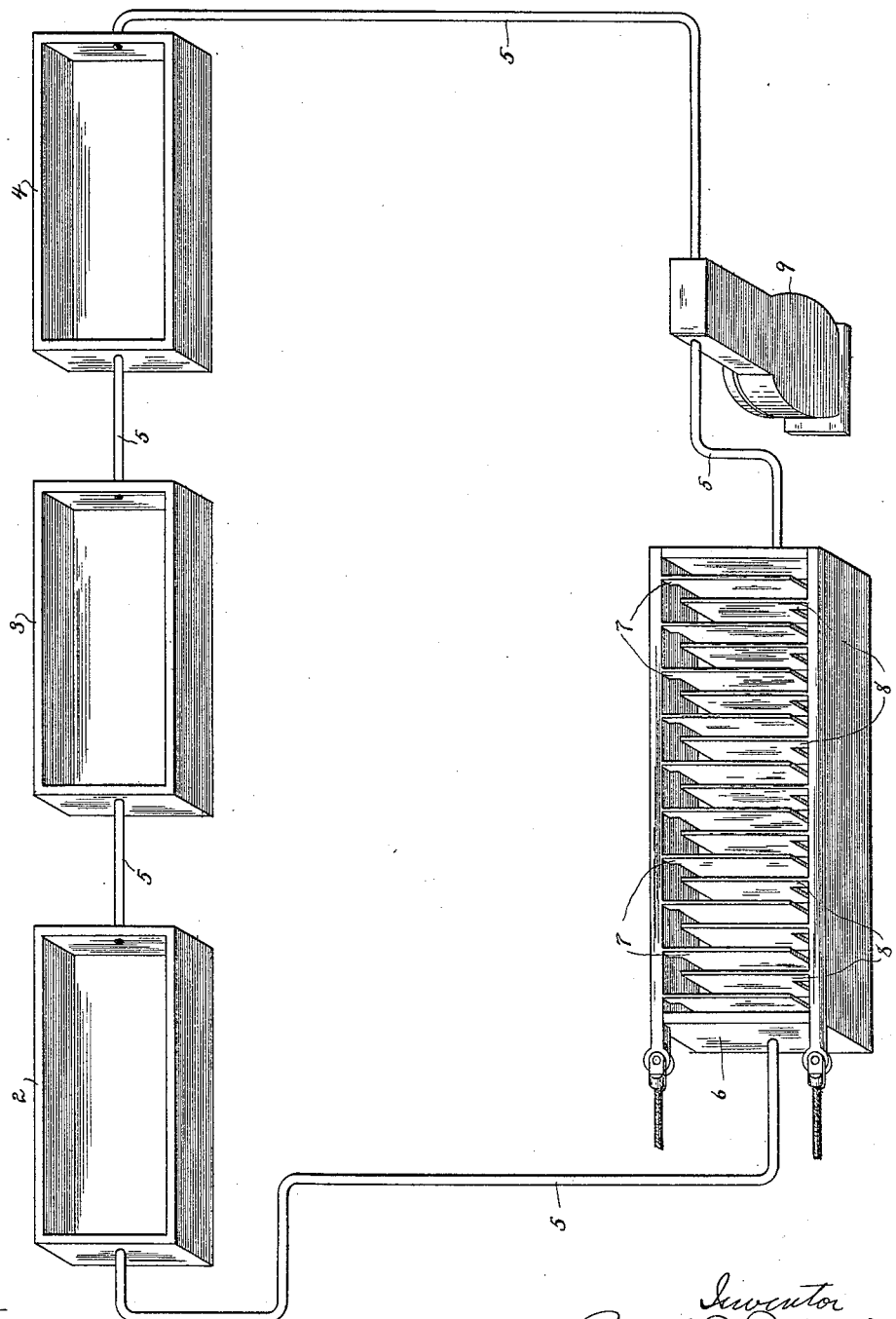

UNITED STATES PATENT OFFICE.

RALPH R. PARISH, OF WATERBURY, CONNECTICUT, ASSIGNOR TO CHASE ROLLING MILL CO., OF WATERBURY, CONNECTICUT, A CORPORATION.

METHOD OF MAINTAINING THE EFFICIENCY OF BRASS-PICKLING SOLUTIONS.

1,086,079. Specification of Letters Patent. Patented Feb. 3, 1914.

Application filed January 11, 1913. Serial No. 741,446.

*To all whom it may concern:*

Be it known that I, RALPH R. PARISH, a citizen of the United States, residing at Waterbury, in the county of New Haven and State of Connecticut, have invented a new and useful Improvement in Methods of Maintaining the Efficiency of Brass-Pickling Solutions; and I do hereby declare the following, when taken in connection with the accompanying drawings and the characters of reference marked thereon, to be a full, clear, and exact description of the same, and which said drawings constitute part of this application, and represent a diagrammatic view of a series of vats arranged in accordance with my invention.

According to the present practice, the pickling solutions employed in brass mills are roughly maintained in efficiency by from time to time removing a part of the solution in any vat and returning thereto a corresponding amount of sulfuric acid and water. The impure solution removed, although rich in copper, is thrown away. This method is not only objectionable on account of the time and labor employed to constantly watch and renew the solutions, but also because the solutions constantly vary in efficiency, steadily declining from the time of renewal, and furthermore because the impure solutions thrown away are rich in copper which is lost.

The object of my present invention is to maintain the pickling solutions of brass mills at a constant predetermined efficiency, to save the time and labor now spent in the care of the solutions, and to recover all of the copper dissolved during the pickling operation.

With these ends in view, my invention consists in a method of maintaining the efficiency of brass pickling solutions, consisting in circulating the solution in a series of connected tanks through an electrolyzing tank containing insoluble anodes.

In carrying out my invention as herein shown, I employ a series of pickling vats 2, 3 and 4, connected by pipes 5 and including an electrolyzing or storage vat 6 which contains insoluble anodes 7 and metallic cathodes 8. Provision will be made by means of a pump 9 for establishing a continuous circulation of the entire body of pickling fluid through the series of tanks including the electrolyzing tank. The pump may be located at any convenient point desired, or the tanks may be arranged so that the fluid will flow from one to the other by gravity to be ultimately pumped from the last tank to the first. As the liquid passes through the electrolyzing tank and is subjected to the action of the current therein, the copper content of the solution is deposited upon the cathodes with the corresponding return to the solution of sulfuric acid according to the following equation:

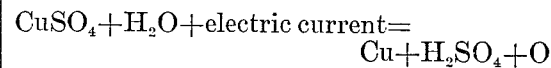

$$CuSO_4 + H_2O + \text{electric current} = Cu + H_2SO_4 + O$$

The amount of sulfuric acid thus restored to the solution maintains the same at a predetermined point of acidity and therefore at a predetermined efficiency.

When once started, the installation calls for but little attention beyond that required to remove the metallic copper deposited on the cathodes, to replace the water and acid lost mechanically and by evaporation and to make occasional tests to determine the acidity of the solution.

I claim:—

A method of maintaining a predetermined amount of acidity in an active or unspent brass pickling solution comprised of copper surfate, zinc sulfate, sulfuric acid and water, the said method consisting in providing for the continuous circulation of the unspent solution through an electrolyzing tank containing insoluble anodes and metallic cathodes, whereby a continuous electrolysis of the solution is maintained and a predetermined amount of acidity in the solution is sustained by the removal of a portion of its copper and the restoration to the solution of an equivalent amount of sulfuric acid.

In testimony whereof, I have signed this specification in the presence of two subscribing witnesses.

RALPH R. PARISH.

Witnesses:
CLARA L. WEED,
GEORGE D. SEYMOUR.

Copies of this patent may be obtained for five cents each, by addressing the "Commissioner of Patents, Washington, D. C."